United States Patent
Liang et al.

(10) Patent No.: US 9,778,100 B2
(45) Date of Patent: Oct. 3, 2017

(54) FLAME DETECTOR COVERAGE VERIFICATION SYSTEM HAVING A DECLINATION INDICATOR TO DETERMINE AND VISUALLY DISPLAY THE TILT ANGLE OF A CENTER LINE OF THE FLAME DETECTOR

(71) Applicant: General Monitors, Inc., Lake Forest, CA (US)

(72) Inventors: Edwin Choo Yong Liang, Singapore (SG); Yaofeng Xu, Suzhou (CN)

(73) Assignee: General Monitors, Inc., Lake Forest, CA (US)

( * ) Notice: Subject to any disclaimer, the term of this patent is extended or adjusted under 35 U.S.C. 154(b) by 145 days.

(21) Appl. No.: 14/996,808

(22) Filed: Jan. 15, 2016

(65) Prior Publication Data

US 2017/0205278 A1    Jul. 20, 2017

(51) Int. Cl.
*G01J 5/00* (2006.01)
*G01J 1/04* (2006.01)

(52) U.S. Cl.
CPC .................. *G01J 1/0414* (2013.01)

(58) Field of Classification Search
CPC ..... G08B 17/103; G08B 17/00; G01J 5/0014; G01J 5/041
USPC ............................................. 250/554, 214 R
See application file for complete search history.

(56) References Cited

U.S. PATENT DOCUMENTS

| 6,150,943 A | 11/2000 | Lehman et al. |
| 2010/0073926 A1* | 3/2010 | Kudoh .................. G08B 29/08 362/235 |
| 2015/0371514 A1 | 12/2015 | Bonisch et al. |

FOREIGN PATENT DOCUMENTS

| DE | 102004035027 | 2/2006 |
| JP | 2005077279 | 3/2005 |

OTHER PUBLICATIONS

International Search Report and Written Opinion of the International Searching Authority for International Application PCT/US2017/013432, dated Apr. 11, 2017.

(Continued)

*Primary Examiner* — Que T Le
(74) *Attorney, Agent, or Firm* — Larry K. Roberts

(57) ABSTRACT

An embodiment of a flame detector coverage verification system includes an optical source for generating a light beam, and a control unit configured to point the beam in a direction generally co-aligned with an optical center line of the flame detector and through a range of movement about the direction to visually demarcate an area that falls within the flame detector's field of view. In one embodiment, the control unit includes a movable mirror to deflect the laser beam. The system may include an indicator device configured to determine and visually indicate a pan direction of the detector optical center line with respect to a defined direction, and a declination indicator configured to determine and visually display the tilt angle (angle of declination) of the detector optical center line with respect to a ground plane.

20 Claims, 17 Drawing Sheets

(56) References Cited

OTHER PUBLICATIONS

Instructions, "Cone of Vision Tester for X-series Flame Detectors," Q1201C Laser Holder and Laser, Det-Tronics, with a copyright notice of 2006, by Detector Electronics Corporation, four pages.
Assembly Diagram, Spectrex Inc., "IR3 Flame Detector Assy With Laser Aimer," Detector 40/401-XXXX, Laser Aimer P/N: 777166, with dates Jun. 2, 2006 and Dec. 14, 2010 (one page).
Diagram, Spectrex Inc., "Laser Aimer Assy," OL-177166, dated Jun. 2, 2009.

* cited by examiner

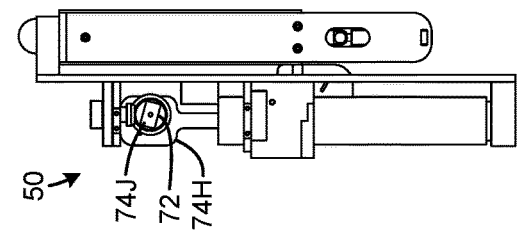
FIG. 11H  FIG. 11G  FIG. 11F
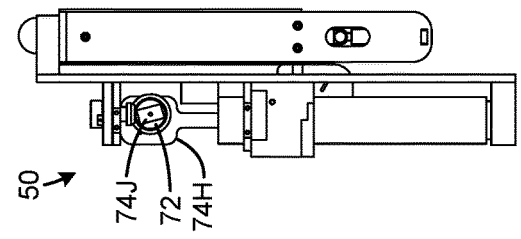
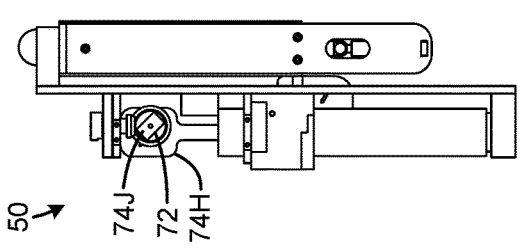
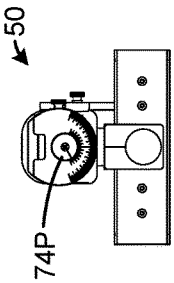
FIG. 11E
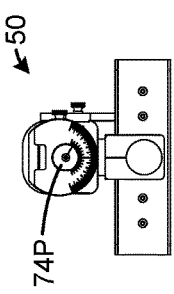
FIG. 11D
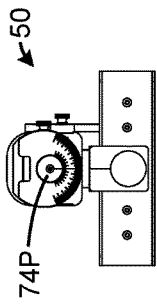
FIG. 11C

FLAME DETECTOR COVERAGE VERIFICATION SYSTEM HAVING A DECLINATION INDICATOR TO DETERMINE AND VISUALLY DISPLAY THE TILT ANGLE OF A CENTER LINE OF THE FLAME DETECTOR

BACKGROUND

Flame detectors are in use in many environments, typically hazardous locations such as refineries, chemical plants, compressor stations, and fuel loading facilities. Flame detectors typically have an optical field of view, within which the detector has sensitivity to detect flames within range of the detector. The individual flame detectors are typically connected together to form a network of flame detectors configured to cover a larger area, as part of a detection system which in turn may be part of a fire suppression and/or alarm system. Flame detector coverage is critical because it determines the effectiveness of the system to fight a fire and to warn of the danger.

When a flame detector is unable to see an incipient fire, either because its optical field of view is blocked by an obstruction bigger than the fire, or because the incipient fire is at the periphery of the detector's optical field of view (where the detector's sensitivity is typically at its lowest), the flame detection system will not react with the planned fire mitigation action. In this case, the flame detection system is deemed less effective due to poor detection coverage.

The flame detection system may eventually react at a later stage when the incipient fire has grown in size and falls more into the detector optical field of view. But such a delay in response is typically undesired because the consequence of a larger fire is usually much greater. It is usually highly desired, that any fire breakout be detected as early as possible so that fire mitigation action can be triggered at an earlier stage, so that the fire is extinguished before it has the time to grow larger in size.

SUMMARY

An exemplary embodiment of a flame detector coverage verification system includes an optical source for generating a light beam, and a light-path control unit coupled to the optical source and configured to direct the beam in a direction generally co-aligned with a center line of the flame detector and through a range of movement about the direction to visually demarcate an area that falls within the flame detector's field of view. A frame base system temporarily mounts the optical source and the control unit to an installed flame detector. In one embodiment, the control unit is configured to move the optical light source in a pan and tilt direction to achieve the desired range of movement of the light beam. In another embodiment, the control unit includes a mirror for reflecting the light beam and a mirror actuator mechanism configured to position the mirror to reflect the light beam through the range of movement.

BRIEF DESCRIPTION OF THE DRAWINGS

Features and advantages of the disclosure will readily be appreciated by persons skilled in the art from the following detailed description when read in conjunction with the drawing wherein:

FIGS. 11A-11H illustrate the light-path control unit of the embodiment of FIG. 4 and exemplary positions of the control unit to achieve a light path on the center line, and at vertical declination angles $+\beta1$ and $-\beta2$.

DETAILED DESCRIPTION

Figure 1:
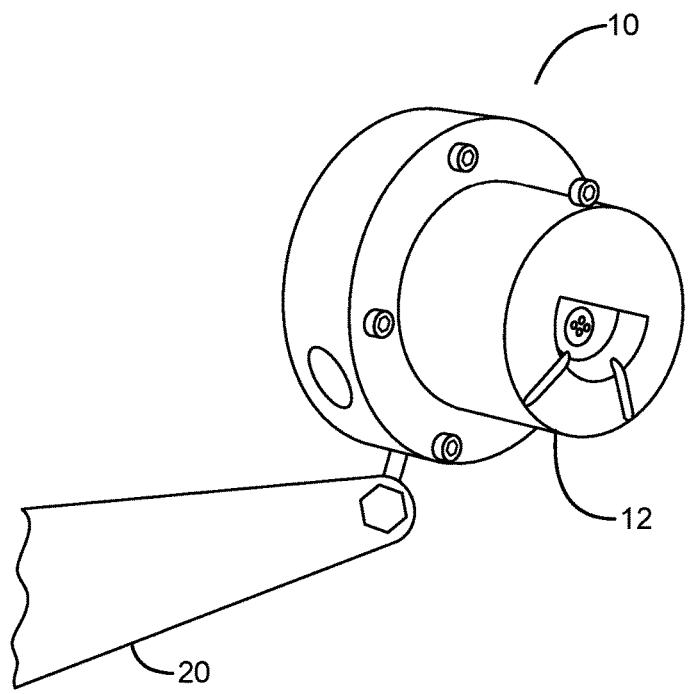
FIG. 1 is a diagrammatic isometric view illustrating a flame detector mounted on a bracket.
Figure 1A:
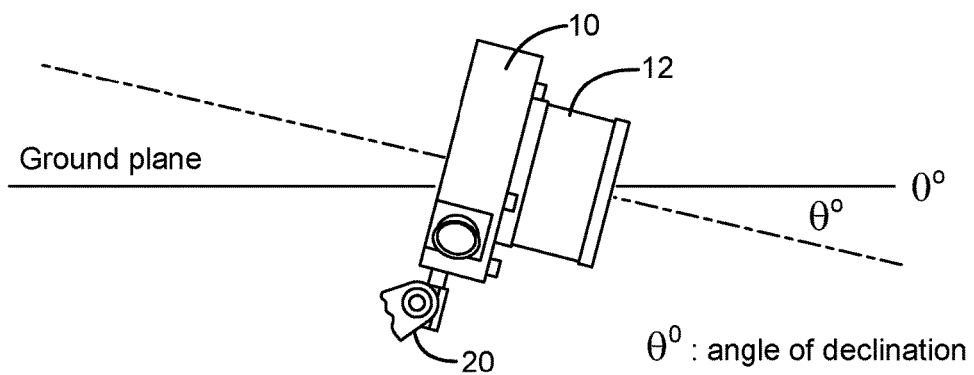
FIG. 1A illustrates a declination coordinate of the flame detector relative to the ground plane.

In the following detailed description and in the several figures of the drawing, like elements are identified with like reference numerals. The figures may not be to scale, and relative feature sizes may be exaggerated for illustrative purposes.

In accordance with aspects of the invention, exemplary embodiments of a flame detector coverage verification device are disclosed. The coverage verification device may be a simple mechanical device for attachment onto installed flame detectors. The attachment of an exemplary device is temporary; the device is attached only during detector orientation and aligning. The device will typically be removed after the detector is fixed into correct orientation and alignment. Preferably the coverage verification device is configured to fit multiple models/sizes of flame detectors. Embodiments of the device are lightweight, and easily attachable to a flame detector body, preferably by clamping-on without the need for fixation screws. If fixation screws are used to lock the device into a position, the tightening of these screws preferably does not require any hand tools such as screw-drivers or Allen-keys.

Figure 2:
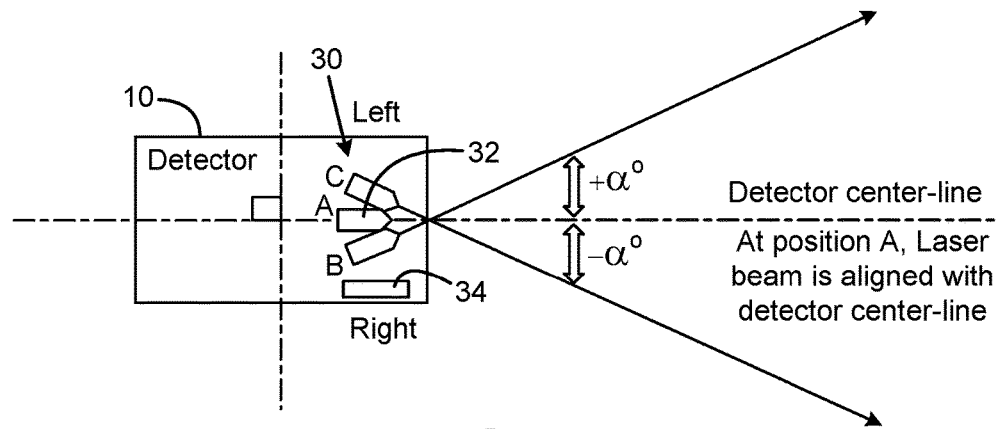
FIG. 2 is a diagrammatic view illustrating an exemplary flame detector coverage system using a laser indicator, showing the laser oriented at extreme azimuth field-of-view coordinates as well as at detector centerline.
Figure 3:
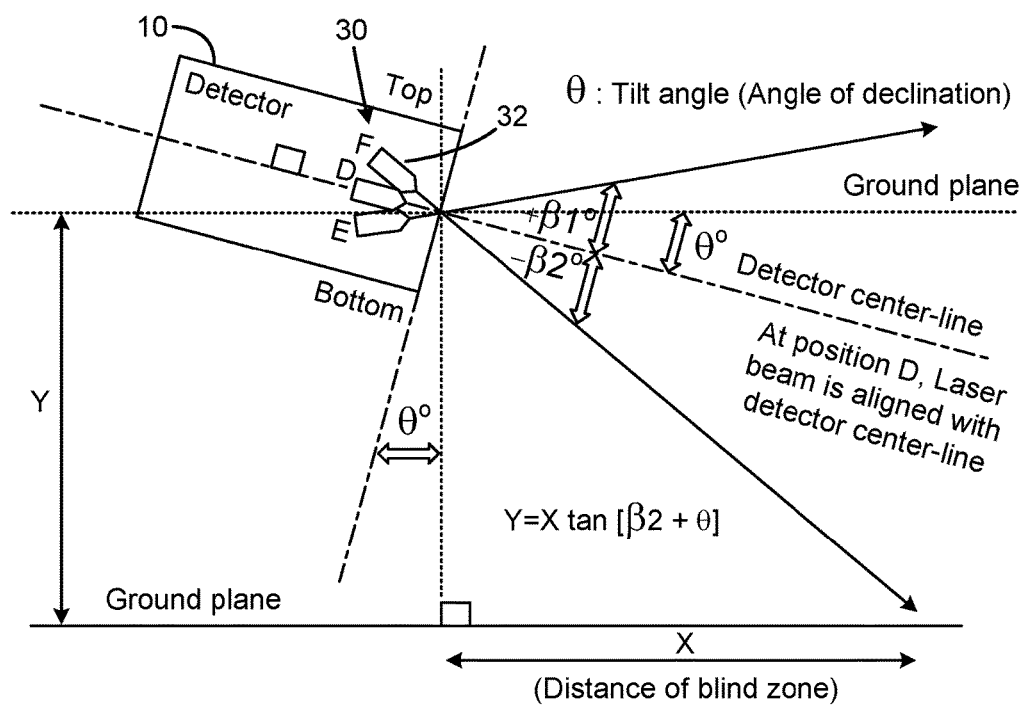
FIG. 3 is a diagrammatic view illustrating the system of FIG. 2, and showing representative angular positions of the laser and laser beam at tilt angles of declination relative to the ground plane.

Embodiments of the device include a laser pointer and a laser light-path control unit. Referring to FIGS. 2 and 3, the device 30 includes the laser pointer 32 and light-path control unit diagrammatically indicated as 34. The control unit allows the laser beam direction to be co-aligned (parallel) to the detector center-line (laser pointer at position A on FIG. 2). For some flame detectors, the optical center line is coincident with the center line of the flame detector housing. For other flame detectors, the detector optical center line may be offset from the center line of the housing. From this position of alignment, the control unit is configured to sweep the laser beam in a pan direction to point to the left (−) in azimuth, or to the right (+), rotating around an axis that is perpendicular to the detector center-line, until the beam direction angle reaches a maximum $\alpha°$.

In this exemplary embodiment, the control unit 34 is a device holding the laser and moving the laser to achieve the beam sweep. In another embodiment described below, the control unit includes a movable mirror to reflect the laser beam to achieve the desired beam coverage.

As shown in FIG. 2, $+\alpha°$ is the maximum angle to the left of the detector center-line (laser pointer at position B in FIG. 2) and $-\alpha°$ is the maximum angle to the right of the detector center-line (laser pointer at position C in FIG. 2). The value of $+\alpha°$ and $-\alpha°$ depend on the detector type and the detector sensitivity setting, and is typically at equal angles.

In an exemplary embodiment, the control unit is configured to lock the laser beam direction at the respective positions at $+\alpha°$ and $-\alpha°$. The laser beam directions at these angles, demarcate the leftmost and rightmost boundaries of the conical field of view at its widest angle away from the detector center-line.

Likewise, from the position of alignment with the detector center line, which center line may have a declination angle $\theta°$ to the ground plane, the light-path control unit is configured to sweep the laser beam in a tilt direction to point above (+) the detector center-line, i.e. in elevation, or to point below (−) the detector center-line, rotating around an axis that is perpendicular to the detector center-line and parallel with the ground plane, until the angle between the beam direction and the detector center-line reaches a maximum angle, $\beta°$.

In an exemplary embodiment, $+\beta1°$ is the maximum angle above the detector center-line (laser at position E on FIG. 3) and $-\beta2°$ is the maximum angle below the detector center-line (laser at position F on FIG. 3). The values of $\beta1°$ and $\beta2°$ typically depend on the detector type and the detector sensitivity setting, and may not necessary be the same.

In an exemplary embodiment, the laser light-path control unit 34 is configured to lock the laser beam direction at the respective $+\beta1°$ and $-\beta2°$ beam directions. The laser beam directions at these angles demarcate the uppermost and lowermost boundaries of the conical field of view at its widest angle away from the detector center-line.

In an exemplary embodiment, the device may have angle markings on it so that it is possible for the field commissioning engineer to easily note the angles $+\alpha°$, $-\alpha°$, $+\beta1°$ and $-\beta2°$ with the flame detector locked into position.

In an exemplary embodiment, the power output of the laser pointer is preferably sufficient to illuminate a point on a physical surface at least 50 feet (15.2 meters) away from the detector. The spots marked by the laser point are preferably clearly visible under bright sun-light. Green and red colored lasers may be utilized under various light conditions.

In accordance with a further aspect, in an exemplary embodiment, the laser is preferably intrinsically safe and suitable for use in a classified Class 1 Division 2 or Zone 2 hazardous environment. This will allow the device to be used in an operating industrial environment. Exemplary laser pointers which comply with the intrinsically safe classification are commercially available.

In accordance with a further aspect, the device 30 includes a compass to indicate the angular orientation of the device relative to magnetic North, and a declination indicator to determine the angle of declination $\theta°$ referenced to the ground plane. The device may have angle markings on it so that it is possible for the field commissioning engineer to easily adjust and lock the detector tilt angle to a desired angle of declination $\theta°$.

At a given detector mounting height (Y height in FIG. 3), the angle of declination $\theta°$ can be used to manually calculate the 'blind zone distance' (X distance in FIG. 3) below the conical FOV of the detector.

The angle of declination $\theta°$ can also be applied into flame mapping software to determine the detection coverage area at various tilt angles and detector mounting heights.

Figure 4:
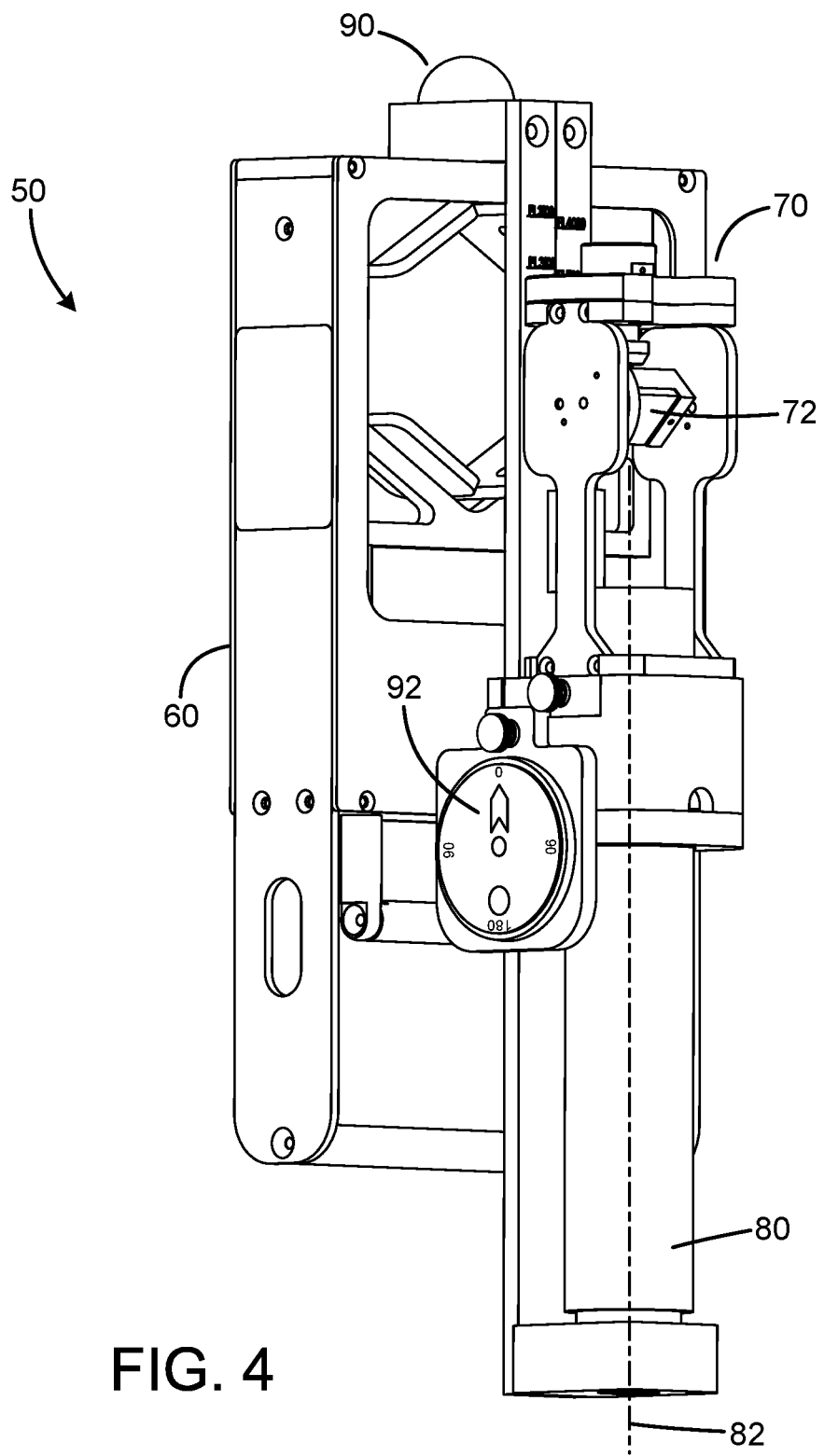
FIG. 4 is a frontal isometric view of another exemplary embodiment of a flame detector coverage verification system.

Another exemplary embodiment of a flame detector coverage verification device 50 is illustrated in FIGS. 4-12F. The device includes a frame base system 60, a light beam-path control unit 70, a light source 80, a compass 90 and a declination indicator 92. In this example, the light source 80 is an intrinsically safe laser module for directing a laser beam upwardly along light source axis 82 (FIG. 4). The control unit 70 includes a mirror 72 mounted for movement about a horizontal axis and an axis perpendicular to the horizontal axis, and configured to deflect the light beam along directions angles $+\alpha°$, $-\alpha°$, $+\beta1°$ and $-\beta2°$, as will be described in further detail below.

Figure 4A:
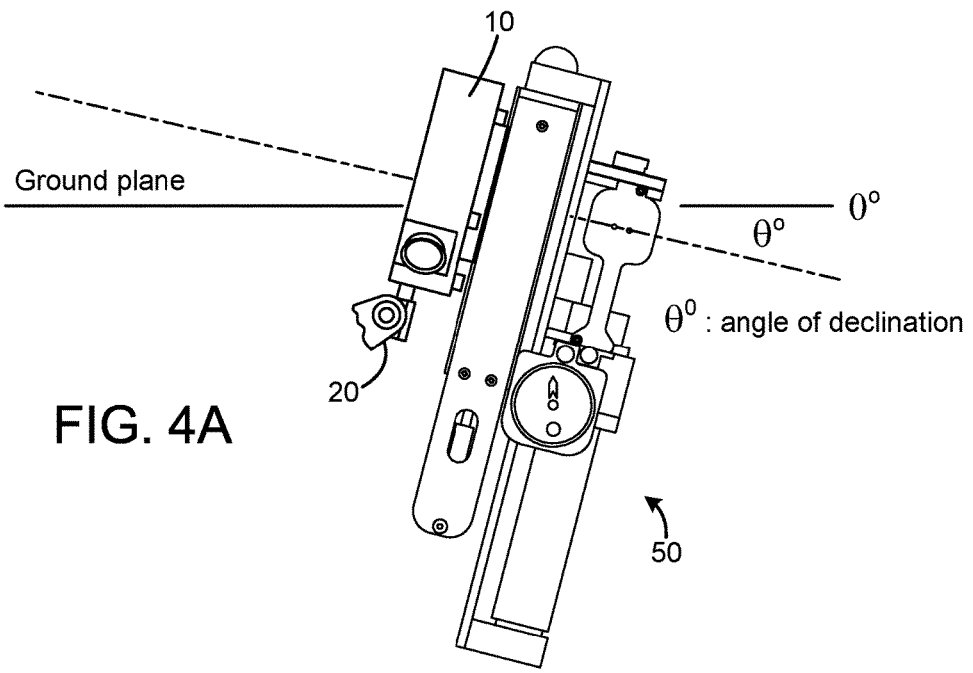
FIG. 4A is a side view illustrating the verification system in place on a flame detector.

FIG. 4A depicts the verification device in place on an exemplary flame detector.

Figure 5:
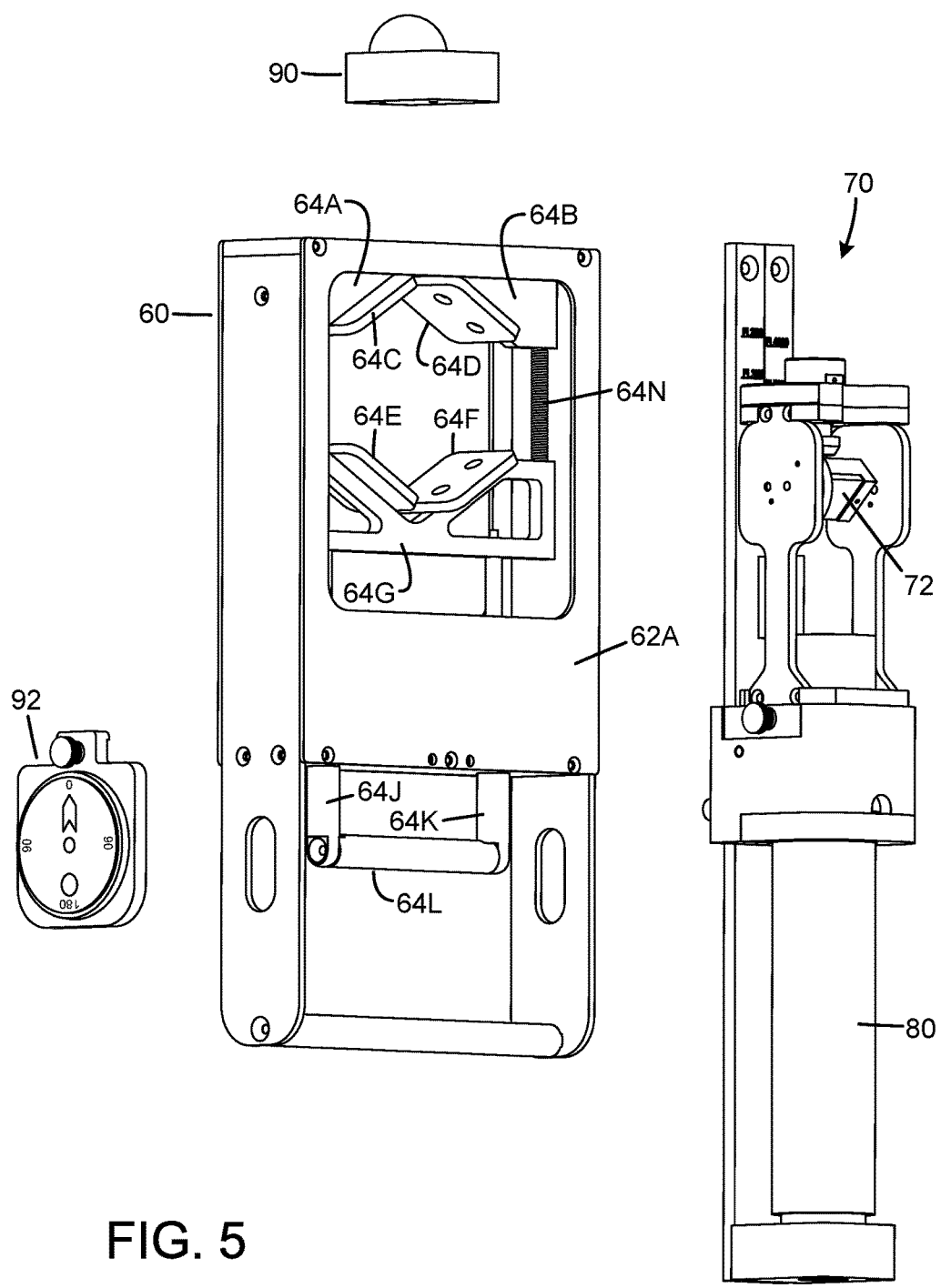
FIG. 5 is an exploded isometric view of the system of FIG. 4.
Figure 7A:
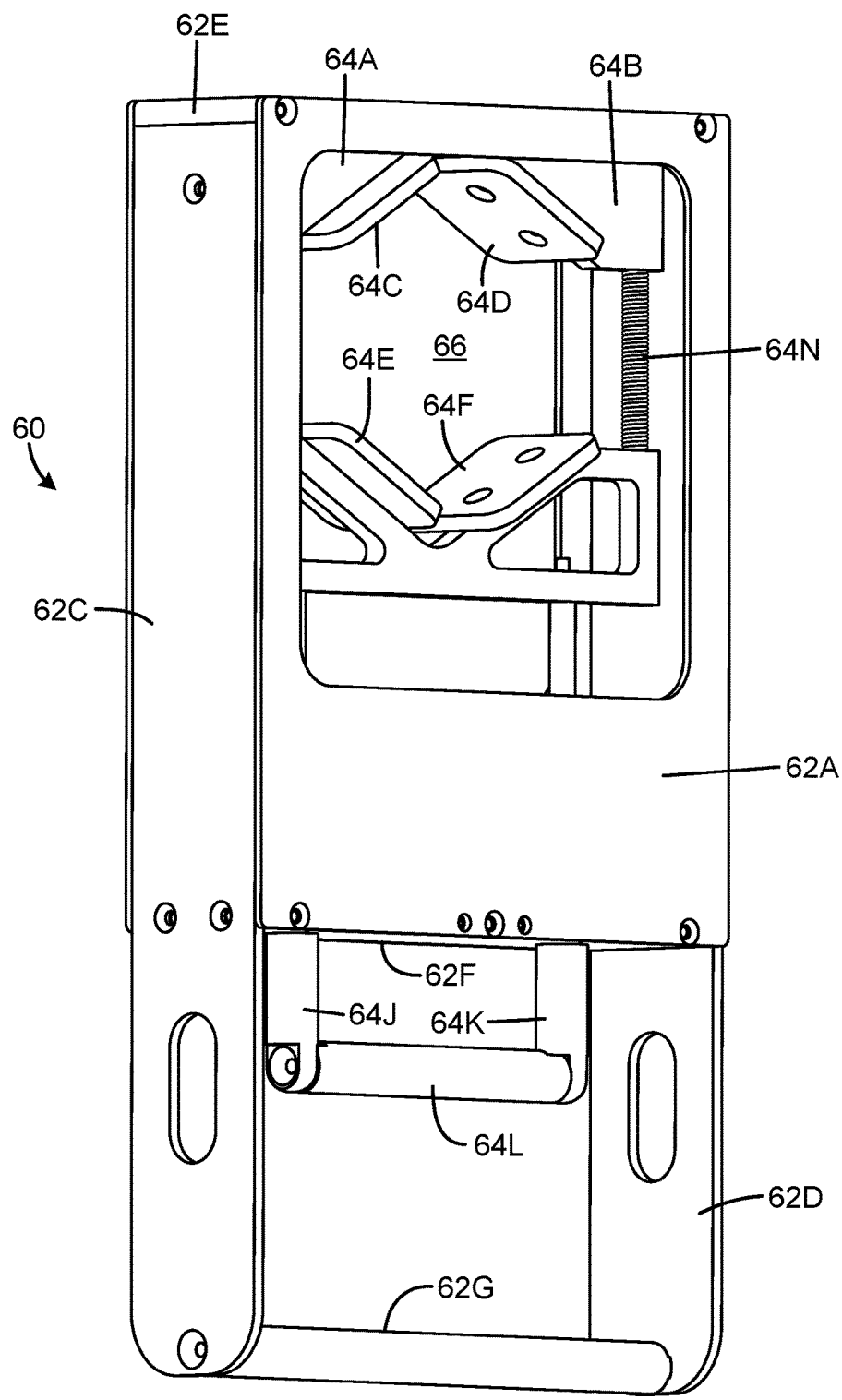
FIG. 7A is an isometric view of the frame base of the exemplary embodiment of FIG. 4.
Figure 7B:
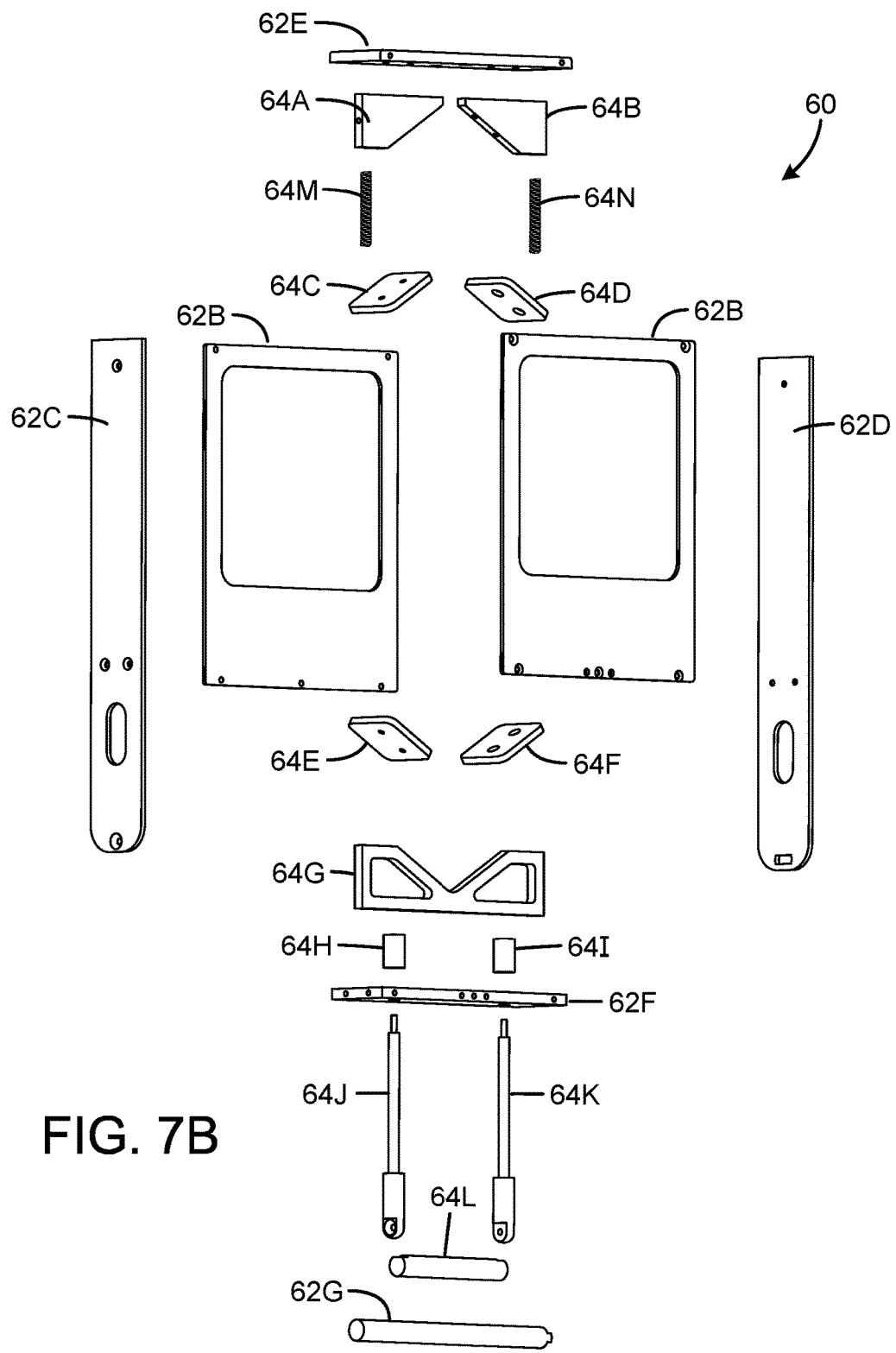
FIG. 7B is an exploded view of the frame base of FIG. 7A.

The frame base system 60, shown in further detail in FIGS. 5 and 7A-7B, includes a frame base comprising left, right, top and bottom frame structures 62C, 62D, 62E, 62F and front and back covers 62A, 62B. These parts may be fabricated of a lightweight rigid material, such as aluminum, and fastened together with threaded fasteners, for example. Attached to the lower surface of the top plate 62E are left and right corner supports 64A, 64B, with respective attached elastomeric upper clamp pads 64C, 64D. The clamp pads 64C, 64D are fixed in position relative to the frame structure. A slidable clamp base 64G has affixed thereto lower elastomeric clamp pads 64E, 64F. The clamp base is attached to ends of slide rods 64J, 64K, which are mounted for sliding movement through sleeves 64H, 64I fixed in openings in the bottom frame plate 62F. A slide handle 64L is attached at the distal ends of the slide rods. A pair of springs 64M, 64N are attached between the corner supports 64A, 64B and upper corners of the clamp base 64G. The springs bias the position of the clamp base 64G to a rest position closest to the corner supports, but allow the slide handle to pull down the clamp base to create an opening generally indicated as 66 (FIG. 7A) to allow the device 50 to be positioned onto an installed flame detector housing. In an exemplary embodiment, the left and right frame structures 62C, 62D have a length on the order of one foot, and the top and bottom frame structures have a length of around six inches, although these dimensions may vary depending on the size of the flame detector(s) for which the device is designed to accommodate.

Figure 6A:
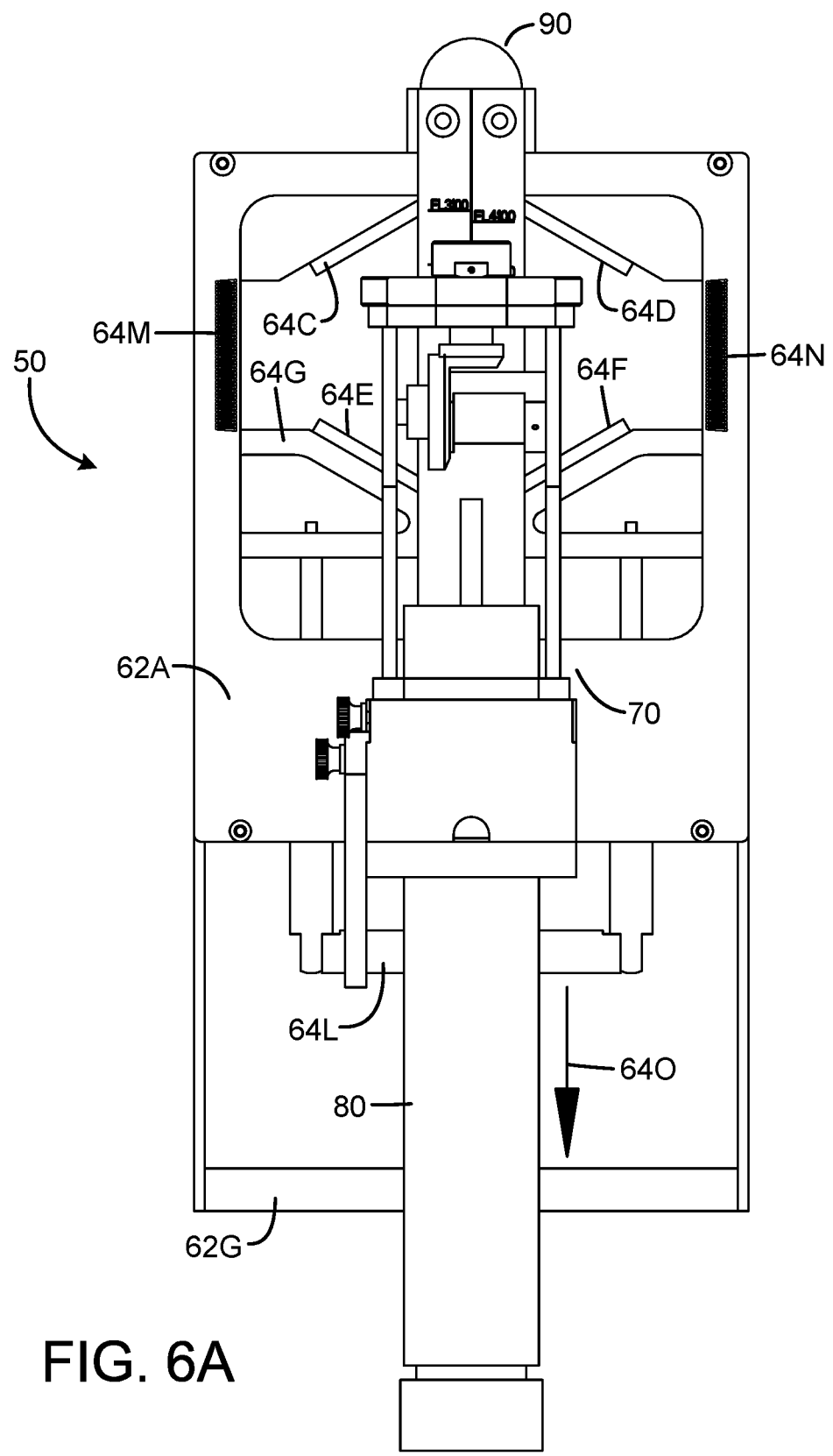
FIG. 6A is a diagrammatic front view of the system of FIG. 4, showing the clamp handle in the rest position.
Figure 6B:
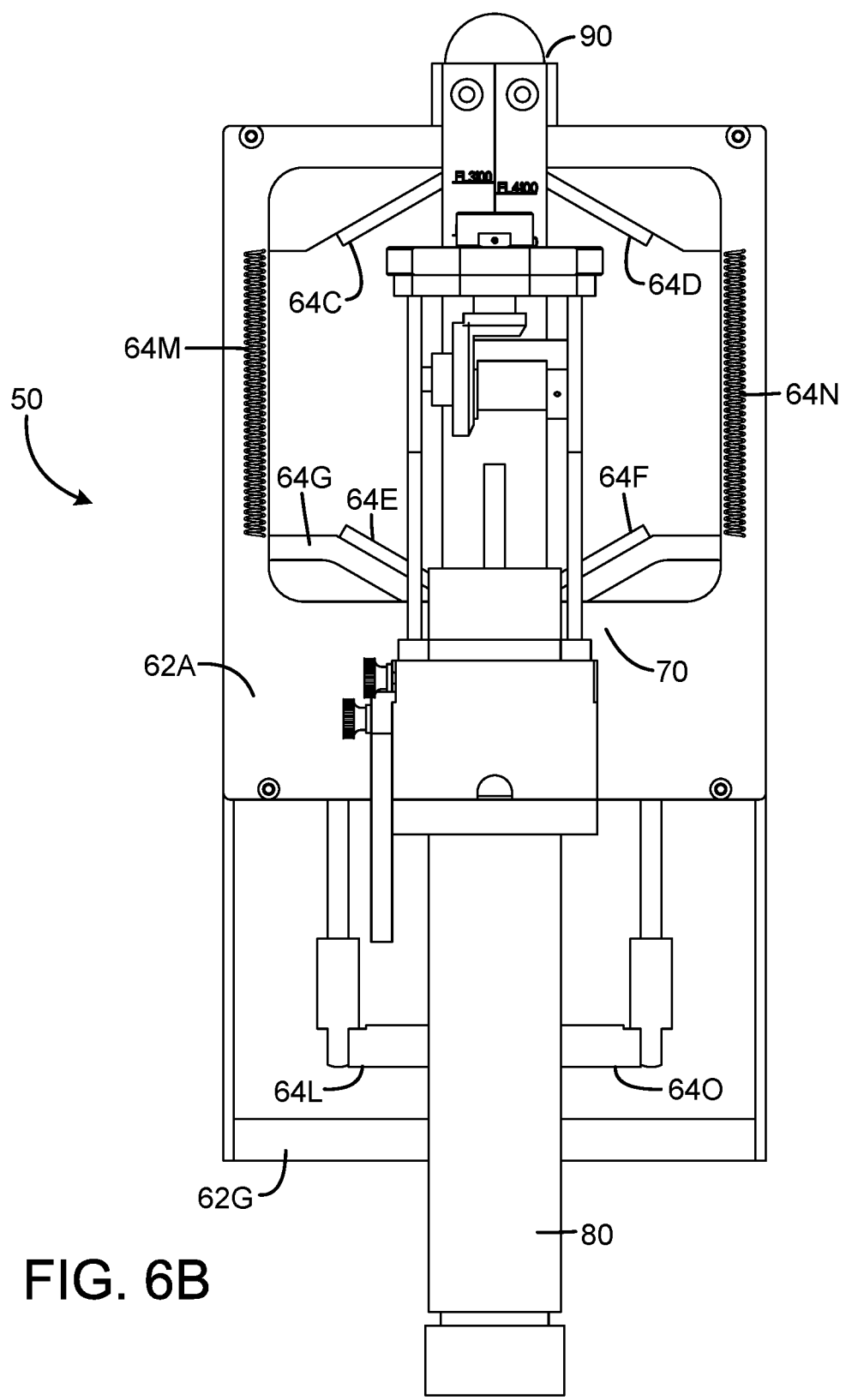
FIG. 6B is a diagrammatic front view similar to FIG. 6A, but showing the clamp handle in the clamp release position.

FIG. 6A shows the clamp base 64G in the rest position, with the springs 64M, 64N diagrammatically shown. To attach the device 50 to the flame detector, the slide handle 64L is pulled down by the field operator in the direction of arrow 64O (FIG. 6A) to open the upper and lower clamp pads sufficiently to allow space for the flame detector housing.

Figure 8A:
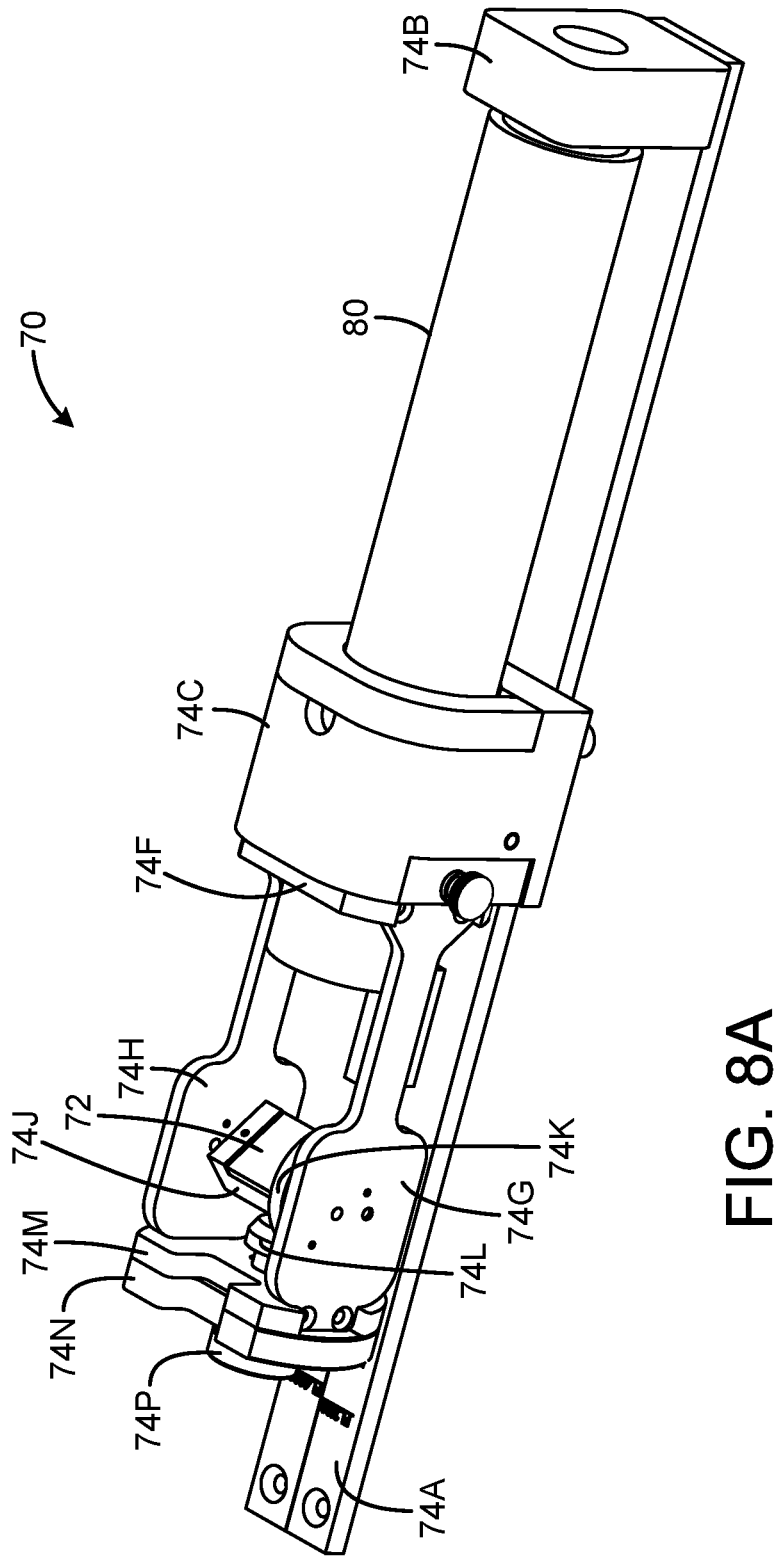
FIG. 8A is an isometric view of the light source path control unit of the system of FIG. 4.
Figure 8B:
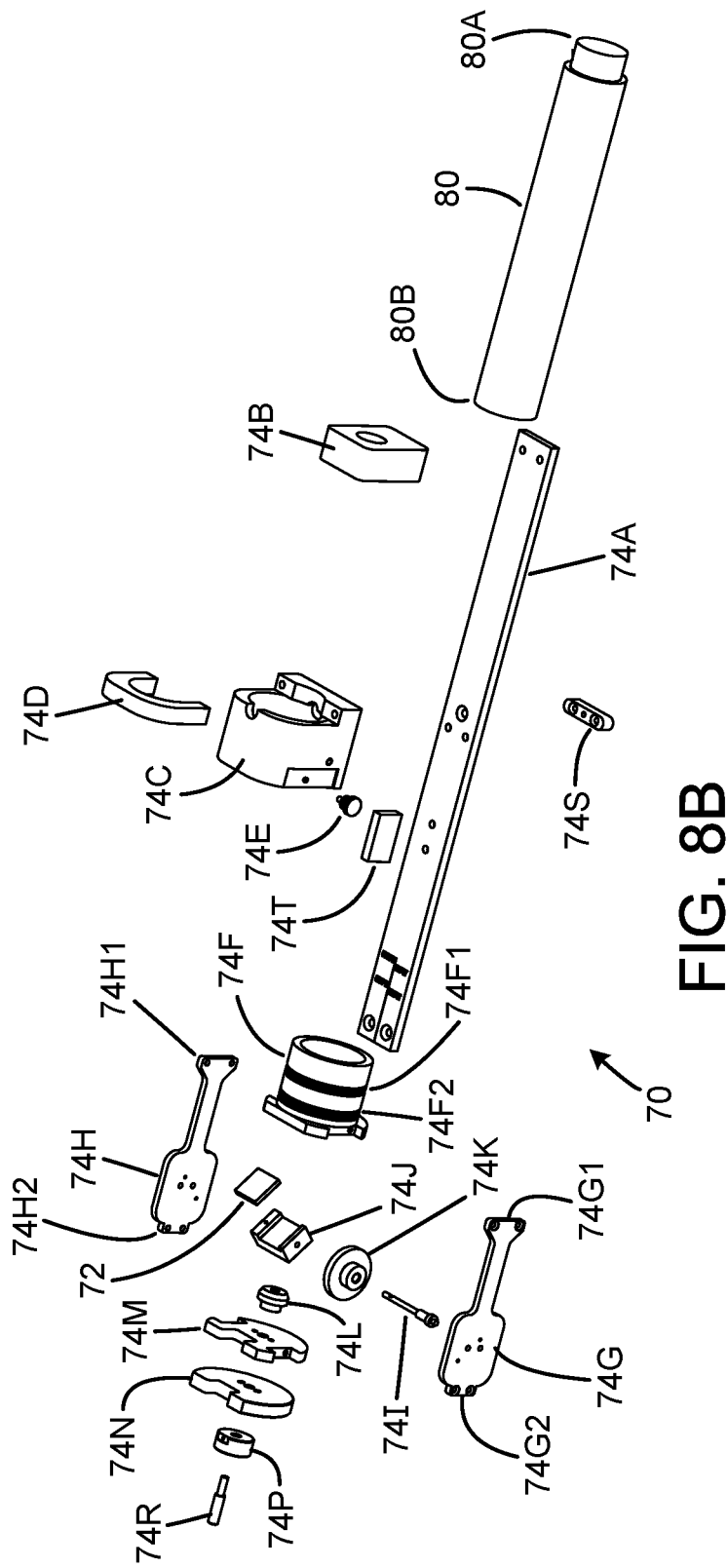
FIG. 8B is an exploded view of the light-path control unit of FIG. 8A.

The light-path control unit 70 is secured to the front cover 62A of the frame base system 60 by threaded fasteners, in this exemplary embodiment. FIGS. 8A and 8B illustrate the control unit 70 in further detail. The unit includes a main beam 74A which is secured to the frame base by threaded fasteners. A bottom base 74B is attached to the lower end of the beam, and an upper laser support base 74C is attached to the beam intermediate the ends of the beam. The support base 74B and a support ring 74D (attached to support base 74C) hold the laser module in an aligned position along the beam; the support ring 74D is fitted over the laser module and attached to the support base 74C by threaded fasteners to secure the laser module in place. The support base 74B has a shallow cylindrical opening configured to receive the end 80A of the laser module 80. The support base 74C has a cylindrical opening as well, sized to receive a slidable sleeve 74F. A stopper block 74T is attached to the beam 74A, to provide a stop surface for the end 80B of the laser module 80.

With the laser module secured in alignment to the main beam 74A, the laser module when activated will direct its light beam along the axis 82 (FIG. 4), to mirror 72. The mirror is mounted on a base 74J (FIG. 8B), which in turn is supported on horizontal pin 74I for pivoting movement. The pin is supported on side plates 74G, 74H, first ends (74G1, 74H1) of which are affixed to opposite sides of the rotatable sleeve 74F. The second ends 74G2, 74H2 of the side plates are attached to a top plate 74M. The rotatable sleeve 74F fits into the opening formed in the support base 74C such that the end 80B of the laser module also fits within the sleeve 74F.

A first angle gear 74K is also fitted onto the pin 74I. A second angle gear 74L is mounted on a pin 74R fitted through a bore in the top plate 74M, so that its teeth engage the first angle gear 74L. A vertical rotate knob 74P is fitted onto the pin 74R, and may be rotated by the device user to rotate the mirror 72 about the axis of pin 74I through a range of movement.

A horizontal rotate plate 74N is affixed to the top plate 74M, and may be turned manually by the device operator to rotate the sleeve within the support base 74C, in turn rotating the mirror horizontally through a range of motion.

Figure 6C:
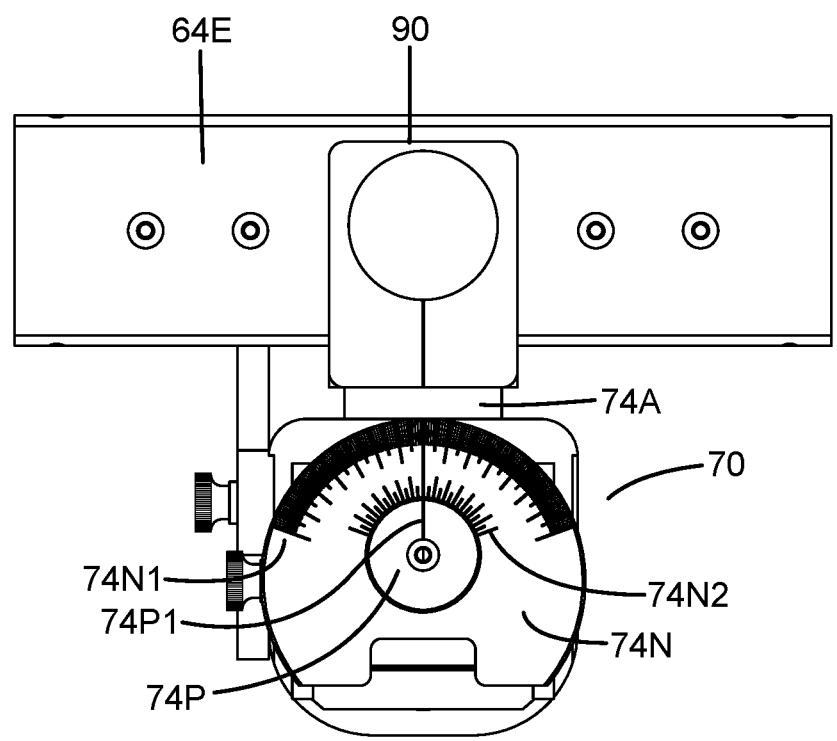
FIG. 6C is a top view of the system of FIG. 4.
Figure 11B:
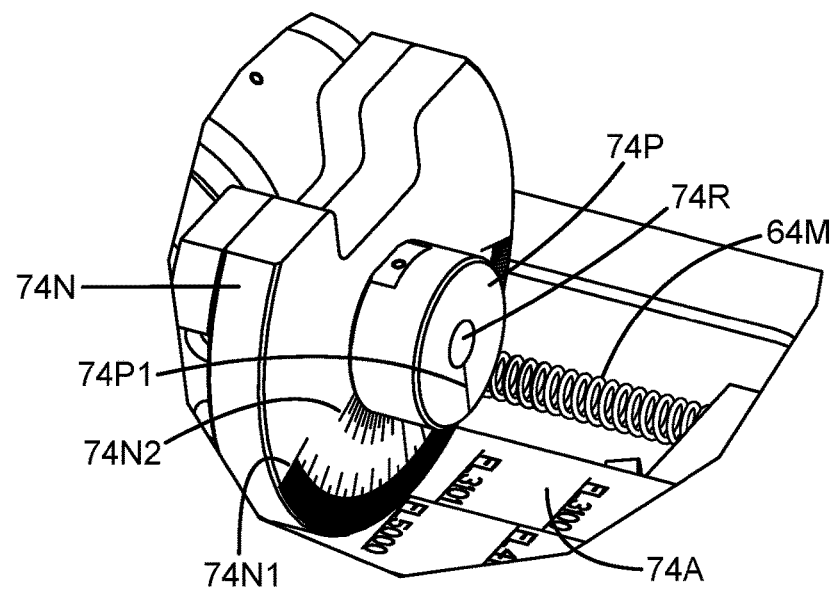

The horizontal rotate plate 74N has formed thereon respective inner and outer scales 74N2 and 74N1 (FIGS. 6C, 11B). The scales indicate angular offset from the zero location indicated in FIG. 6C. When the rotate knob 74P is turned by the device operator, the zero mark 74P1 can be aligned to the mark in the scale 74N2 corresponding to the desired offset of the mirror from the vertical center line. Similarly, by turning the rotate plate 74N, the scale 74N1 may be used to indicate the angular offset from the horizontal center line.

As used herein, e.g., with respect to the pins 74I and 74R, the terms "horizontal" and "vertical" are intended as a reference with the beam 74A mounted vertically. In an exemplary use, the device and beam will often be oriented at an angle $\theta°$ with respect to the ground plane, so the vertical pin is actually oriented away from the vertical.

Figure 8C:
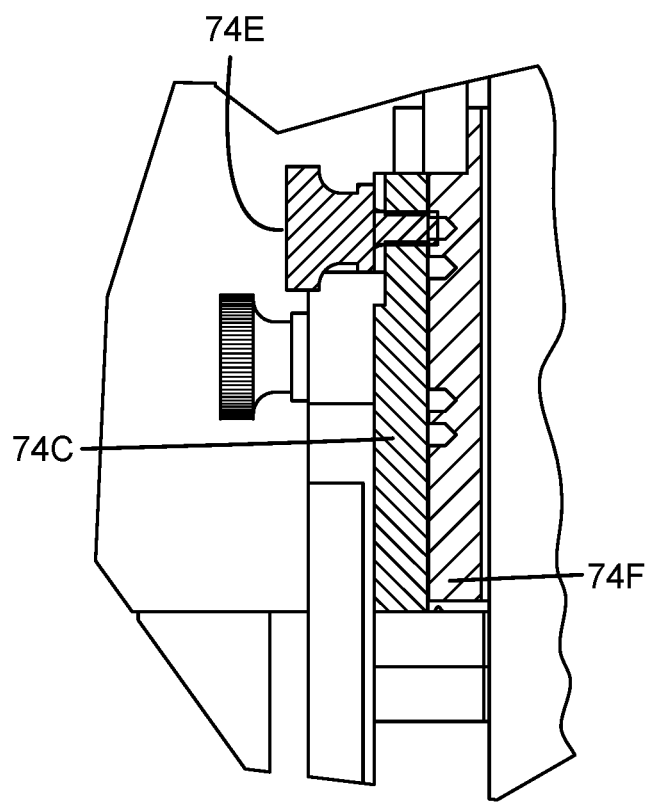
FIG. 8C is a cross-section view illustrating the rotator sleeve and the support block.
Figure 10:
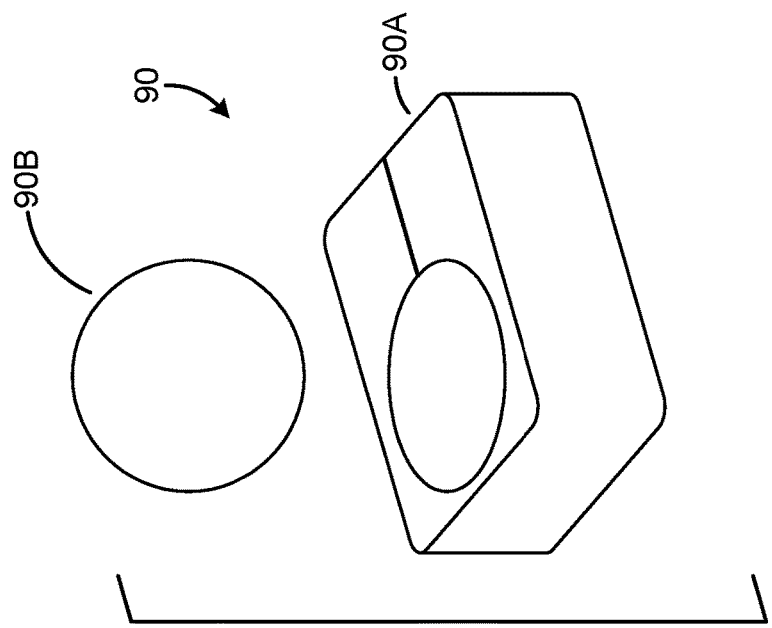
FIG. 10 is an exploded view of an exemplary embodiment of a compass of the system of FIG. 4.

The vertical position of the mirror 72 can be adjusted to accommodate different flame detector configurations or sizes. The vertical position of the rotate sleeve 74F within the support block 74C can be adjusted to one of several preset positions, in this exemplary embodiment. A thumbscrew 74E is threaded into a threaded bore in the side of support block 74C and protrudes into the opening to engage into one of a set of grooves formed in the outer periphery of the rotate sleeve. In FIG. 8B, 74F1 indicates one set of two spaced grooves, and 74F2 indicates another set of two spaced grooves. The tip of the set screw 74E engages into the selected groove to fix the position of the rotate sleeve within support block 74C, as shown in FIG. 8C. The different positions defined by the grooves determine the vertical position of the mirror relative to the beam 74A, since the rotate sleeve carries the mirror 72. These positions correspond to different flame detectors, as indicated in FIG. 11B, such as FL5000, FL3101, FL3100 (flame detector models marketed under the General Monitors brand) and so on.

Figure 11A:
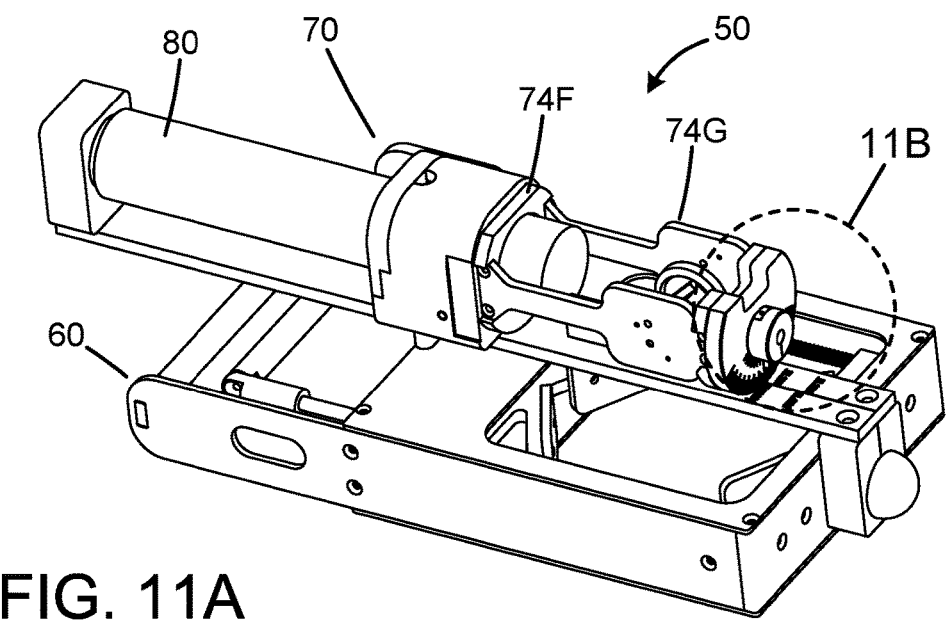

FIGS. 11A and 11B show the device 50 and the light-path control unit in further detail. Rotating knob 74P changes the vertical deflection angle of the mirror 72 (i.e. by rotating the mirror about pin 74I). Rotating the sleeve 74F by turning plate 74N results in changing the horizontal deflection angle of the mirror.

FIGS. 11C-11H illustrate the use of the control unit 70 to position the mirror 72 vertically. FIGS. 11C and 11F are respective top and left side views of the device 50, with the side plate 74H broken away in FIG. 11F to reveal the mirror 72 and support block 74J. In FIGS. 11C and 11F, the control knob is set to the zero line, so that the laser beam light path is directed to the center line. FIGS. 11D and 11G are views similar to FIGS. 11C and 11F, except that the knob 74P is turned in the counterclockwise direction to the position indicated in FIG. 11D, corresponding to light path direction +β1. FIGS. 11E and 11H illustrate the position of the mirror 72 with the knob 74P turned clockwise from the zero position, to a position corresponding to light path direction −β2°.

Figure 12A:
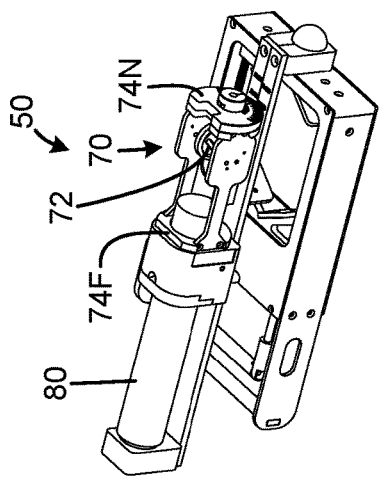
FIGS. 12A-12F illustrate the light-path control unit of FIG. 4 at exemplary positions to achieve a light path on the center line, and at respective horizontal angles $+\alpha°$ and $-\alpha°$.
Figure 12B:
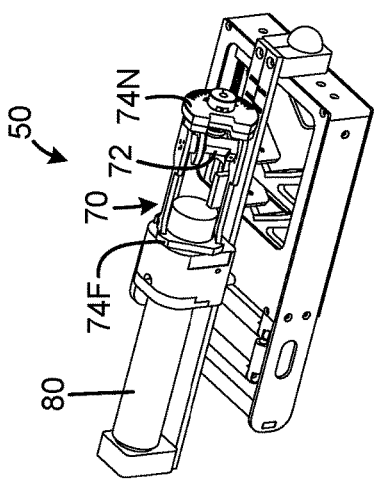
Figure 12C:
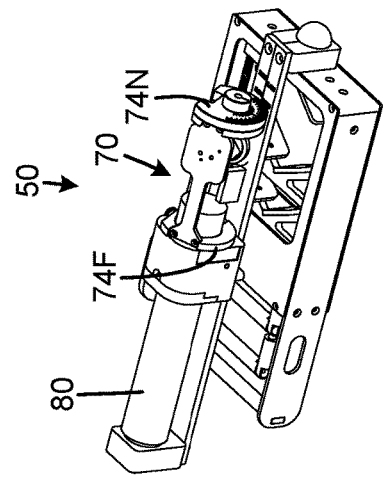
Figure 12D:
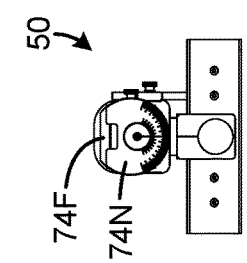
Figure 12E:
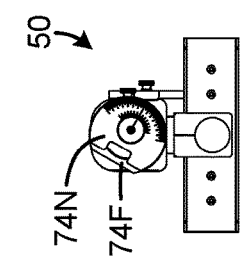
Figure 12F:
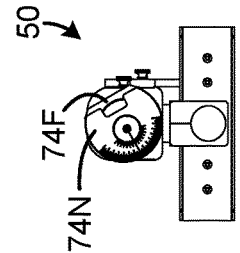

FIGS. 12A-12F similarly illustrate the use of the control unit 70 to position the mirror 72 horizontally. FIGS. 12A and 12D are top and top left isometric views of the device 50, showing the control unit 70 configured to position the laser light beam at the light-path center line, with the rotate plate 74N positioned at the zero location. FIGS. 12B and 12E are views similar to FIGS. 12A and 12D, but with the rotate plate rotated counterclockwise to position the mirror to deflect the laser beam to light-path position +α°. FIGS. 12C and 12F are views similar to FIGS. 12A and 12D, but with rotate plate rotated clockwise with respect to the zero position to position the laser beam at beam location −α°.

Figure 9:
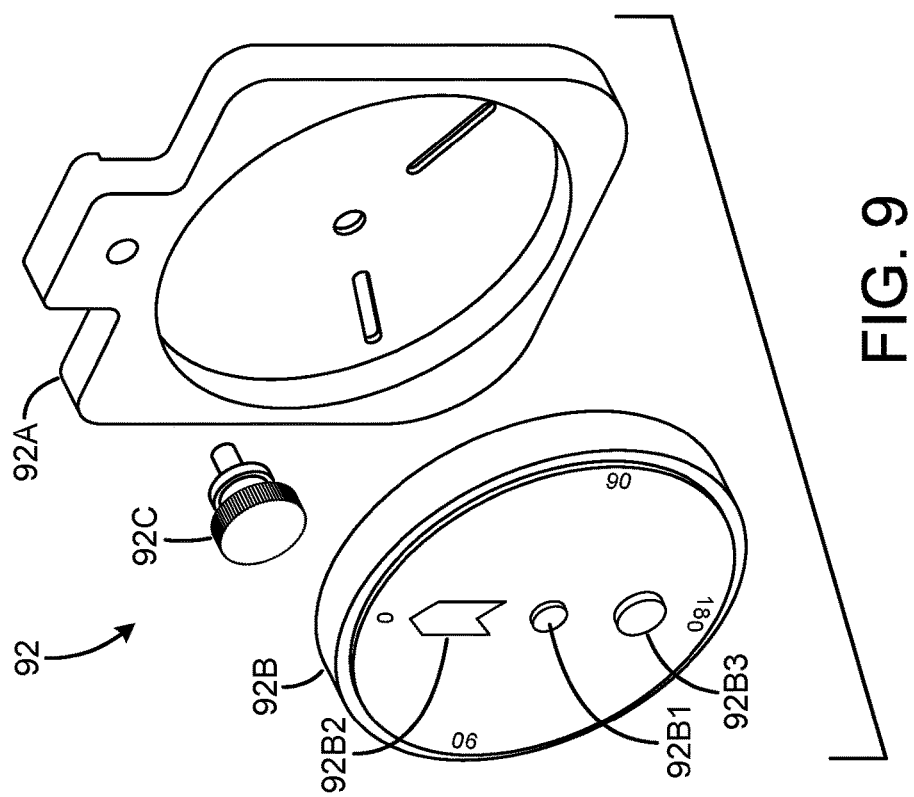
FIG. 9 is an exploded view of an exemplary embodiment of a tilt angle or declination indicator of the system of FIG. 4.

Referring now to FIG. 9, the exemplary device 50 includes a declination indicator 92. The exemplary indicator is a dial device 92B, with a weighted indicator 92B2 mounted for rotation on pin 92B1. A weight 92B3 is attached to the indicator at the end opposite the arrow, and the indicator dial has indicia reflecting angles. The dial device is supported on housing 92A, which is attached to side plate 62C by threaded fastener 92C.

The exemplary device 50 further includes a compass 90 (FIG. 10), which in this example is a liquid-filled compass 90B supported by compass base 90A, secured to the top plate 62E. The compass 90 indicates the direction relative to magnetic North of the device 50.

Although the foregoing has been a description and illustration of specific embodiments of the subject matter, various modifications and changes thereto can be made by persons skilled in the art without departing from the scope and spirit of the invention.

What is claimed is:

1. A flame detector coverage verification system for a flame detector having a field of view, the system comprising:

an optical source for generating a light beam;
a light-path control unit coupled to the optical source and configured to direct the beam in a direction generally co-aligned with a center line of the flame detector and through a range of movement about the direction to visually demarcate an area that falls within the flame detector's field of view;
an indicator device configured to visually indicate a pan direction of the detector optical center line with respect to a defined direction;
a declination indicator configured to determine and visually display the tilt angle (angle of declination) of the detector center line with respect to a ground plane.

2. The system of claim 1, wherein the optical source is a laser configured to generate a visible beam.

3. The system of claim 2, wherein the laser is an intrinsically safe device.

4. The system of claim 1, wherein the indicator device is a compass.

5. The system of claim 1, wherein the control unit comprises a mirror for reflecting the optical beam and a mirror rotator, the pointing system configured to reflect the optical beam through the range of movement.

6. The system of claim 5, wherein the control unit includes a mount to hold the optical source.

7. The system of claim 5, wherein the pointing system is further configured to move the optical beam from the co-aligned center line to extremes of the field of view of the flame detector.

8. The system of claim 7, further comprising an indication device configured to indicate angular deflection of the light beam from the co-aligned center line.

9. The system of claim 8, wherein the indication device comprises indicia formed on a rotate plate rotatable about the co-aligned optical center line to indicate the angular deflection in pan and in tilt.

10. The system of claim 1, further comprising:
a frame base system for temporarily mounting the optical source, control unit, indicator device and declination indicator to an installed flame detector.

11. The system of claim 10, wherein the frame base system comprises:
a frame;
an attaching system configured to temporarily secure the frame to the flame detector;
the frame configured to carry the pointing system;
the frame further configured to support the indicator device and the declination indicator;
wherein the attaching system is configured to temporarily secure the verification system to the flame detector during a verification process, and to be removed from the flame detector following completion of the verification process.

12. The system of claim 11, wherein the attaching system includes a clamping structure with a spring bias mechanism configured to secure the frame to the flame detector without fastening screws.

13. The system of claim 11, wherein the installed flame detector includes a housing, and the attaching system includes a clamp system for clamping to the housing of the flame detector.

14. The system of claim 10, wherein the clamp system is arranged to accommodate flame detectors of different sizes.

15. A flame detector coverage verification system for a flame detector having a field of view, comprising:
an optical source for generating a light beam;
a light-path control unit coupled to the optical source and configured to direct the beam in a direction generally co-aligned with a center line of the flame detector and through a range of movement about the direction to visually demarcate an area that falls within the flame detector's field of view;
a frame base system for temporarily mounting the optical source and the control unit to an installed flame detector;
wherein the control unit comprises a mirror for reflecting the light beam and a mirror actuator mechanism, the mirror actuator mechanism configured to position the mirror to reflect the light beam through the range of movement.

16. The system of claim 15, wherein the control unit is configured to fix the mirror position at a plurality of different positions along a light beam axis to accommodate flame detectors of different sizes or configurations.

17. The system of claim 15, wherein the control unit comprises a mirror mount for mounting the mirror, the mirror mount secured on a pin for pivoting movement to rotate the mirror about a first axis, and a rotatable structure holding the mirror and mirror mount, the rotatable structure configured for rotation about a second axis transverse to the first axis.

18. The system of claim 15, wherein the frame base system is configured to support the optical source in a fixed location relative to the frame base system.

19. The system of claim 15, wherein the frame base system comprises a clamping structure with a spring bias mechanism configured to secure the frame to the flame detector without fastening screws.

20. The system of claim 15, further comprising:
an indicator device configured to visually indicate a pan direction of the detector optical center line with respect to a defined direction; and
a declination indicator configured to determine and visually display the tilt angle (angle of declination) of the detector center line with respect to a ground plane.

* * * * *